(12) United States Patent
Shin et al.

(10) Patent No.: US 10,879,585 B2
(45) Date of Patent: Dec. 29, 2020

(54) MOBILE TERMINAL

(71) Applicant: LG Electronics Inc., Seoul (KR)

(72) Inventors: Minchul Shin, Seoul (KR); Dongjun Choi, Seoul (KR); Hangseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/047,849

(22) Filed: Jul. 27, 2018

(65) Prior Publication Data

US 2019/0312334 A1    Oct. 10, 2019

Related U.S. Application Data

(60) Provisional application No. 62/655,218, filed on Apr. 9, 2018.

(30) Foreign Application Priority Data

May 2, 2018  (KR) .................... 10-2018-0050825

(51) Int. Cl.
*H01Q 1/24* (2006.01)
*H01Q 21/06* (2006.01)
(Continued)

(52) U.S. Cl.
CPC ............ *H01Q 1/242* (2013.01); *H01Q 1/243* (2013.01); *H01Q 9/0407* (2013.01);
(Continued)

(58) Field of Classification Search
CPC ...... H01Q 1/242; H01Q 21/065; H01Q 21/28; H01Q 1/243; H01Q 9/0407; H04M 1/0202
See application file for complete search history.

(56) References Cited

U.S. PATENT DOCUMENTS

| 2007/0171603 A1* | 7/2007 | Yang | ............. H04M 1/0202 |
| | | | 361/679.01 |
| 2011/0186345 A1* | 8/2011 | Pakula | ............. G06F 1/1626 |
| | | | 174/520 |

(Continued)

FOREIGN PATENT DOCUMENTS

| DE | 202017003830 | 11/2017 |
| EP | 2493009 | 8/2012 |

(Continued)

OTHER PUBLICATIONS

Ojaroudiparchin et al., "Multi-Layer 5G Mobile Phone Antenna for Multi-User MIMO Communications", 23rd Telecommunications forum TELFOR 2015 (Year: 2015).*

(Continued)

*Primary Examiner* — Dimary S Lopez Cruz
*Assistant Examiner* — Bamidele A Jegede
(74) *Attorney, Agent, or Firm* — Lee, Hong, Degerman, Kang & Waimey

(57) ABSTRACT

A mobile terminal having a front surface, a rear surface, and side surfaces includes a cover glass allowing an electromagnetic wave to be transmitted therethrough, a case having a metal rim forming an appearance of the top or the bottom of the mobile terminal, and an antenna having a plurality of arrayed antenna patterns to radiate a beamformed transmission signal, wherein the antenna is disposed such that at least a portion thereof is adjacent to the metal rim, and the cover glass includes a planar portion disposed on the front surface or the rear surface and a bent portion bent from at least one end of the planar portion such that the transmission signal is radiated through the cover glass.

13 Claims, 13 Drawing Sheets

(51) Int. Cl.
*H04M 1/02* (2006.01)
*H01Q 9/04* (2006.01)
*H01Q 21/28* (2006.01)
*G06F 1/16* (2006.01)

(52) U.S. Cl.
CPC ........... *H01Q 21/065* (2013.01); *H01Q 21/28* (2013.01); *H04M 1/0202* (2013.01); *H04M 1/026* (2013.01); *H04M 1/0249* (2013.01); *G06F 1/1698* (2013.01)

(56) References Cited

U.S. PATENT DOCUMENTS

| | | | | |
|---|---|---|---|---|
| 2012/0314350 | A1* | 12/2012 | Choi | H04M 1/0202 361/679.01 |
| 2013/0172056 | A1* | 7/2013 | Kim | H04B 1/109 455/571 |
| 2013/0225247 | A1* | 8/2013 | Kim | H04M 1/0202 455/575.1 |
| 2013/0242478 | A1* | 9/2013 | Song | H05K 5/0239 361/679.01 |
| 2014/0111684 | A1* | 4/2014 | Corbin | H01Q 1/243 348/374 |
| 2014/0139978 | A1* | 5/2014 | Kwong | H04M 1/0202 361/679.01 |
| 2014/0266973 | A1* | 9/2014 | DeVries | H01Q 1/38 343/893 |
| 2014/0361931 | A1* | 12/2014 | Irci | H01Q 1/243 343/702 |
| 2015/0035714 | A1* | 2/2015 | Zhou | H01Q 13/106 343/767 |
| 2015/0123857 | A1* | 5/2015 | Park | H01Q 1/243 343/702 |
| 2015/0245513 | A1* | 8/2015 | Moon | G06F 1/20 361/679.01 |
| 2015/0331451 | A1* | 11/2015 | Shin | G06F 3/041 345/173 |
| 2016/0044801 | A1* | 2/2016 | Lee | H04M 1/0202 361/679.55 |
| 2016/0113135 | A1* | 4/2016 | Kim | B32B 37/182 361/679.01 |
| 2016/0156755 | A1* | 6/2016 | Choi | G06F 1/656 455/575.1 |
| 2016/0233573 | A1* | 8/2016 | Son | H04M 1/0202 |
| 2016/0234362 | A1* | 8/2016 | Moon | H04M 1/0202 |
| 2016/0276734 | A1* | 9/2016 | Jin | H01Q 1/2283 |
| 2016/0308563 | A1* | 10/2016 | Ouyang | H04B 1/1081 |
| 2016/0374219 | A1* | 12/2016 | Park | H01Q 1/243 |
| 2017/0033797 | A1* | 2/2017 | Jung | H03K 17/962 |
| 2017/0054200 | A1* | 2/2017 | Kang | H01Q 5/35 |
| 2017/0214132 | A1* | 7/2017 | Jeon | G06Q 20/3278 |
| 2017/0245377 | A1* | 8/2017 | Lee | G01J 1/4204 |
| 2017/0309992 | A1* | 10/2017 | Noori | H01Q 1/2258 |
| 2017/0331507 | A1 | 11/2017 | Berneth et al. | |
| 2018/0026341 | A1* | 1/2018 | Mow | H01Q 1/2291 343/702 |
| 2018/0033571 | A1* | 2/2018 | Choi | G06F 3/0202 |
| 2018/0069588 | A1* | 3/2018 | Jiang | H04B 1/3888 |

FOREIGN PATENT DOCUMENTS

| | | |
|---|---|---|
| EP | 2495806 | 9/2012 |
| EP | 2590258 | 5/2013 |
| EP | 3054655 | 8/2016 |
| KR | 1020150051959 | 5/2015 |
| KR | 1020160047234 | 5/2016 |
| KR | 1020160097106 | 8/2016 |
| KR | 1020170013682 | 2/2017 |
| KR | 1020170019973 | 2/2017 |
| KR | 101735247 | 5/2017 |
| KR | 1020170084811 | 7/2017 |
| KR | 1020180024674 | 3/2018 |
| KR | 1020180031424 | 3/2018 |
| WO | 2014190309 | 11/2014 |
| WO | 2017075481 | 5/2017 |
| WO | 2017090997 | 6/2017 |

OTHER PUBLICATIONS

European Patent Office Application Serial No. 18194395.2, Search Report dated May 24, 2019, 7 pages.
PCT International Application No. PCT/KR2018/009980, International Search Report dated Feb. 28, 2019, 11 pages.
European Patent Office Application Serial No. 20166381.2, Search Report dated Jun. 16, 2020, 8 pages.
Korean Intellectual Property Office Application No. 10-2018-0050825, Notice of Allowance dated Oct. 19, 2019, 2 pages.
Korean Intellectual Property Office Application No. 10-2020-0005888, Notice of Allowance dated Sep. 18, 2020, 2 pages.

* cited by examiner

MOBILE TERMINAL

CROSS-REFERENCE TO RELATED APPLICATION

Pursuant to 35 U.S.C. § 119, this application claims the benefit of U.S. Provisional Application No. 62/655,218 filed on Apr. 9, 2018 and also claims the benefit of earlier filing date and right of priority to Korean Patent Application No. 10-2018-0050825 filed on May 2, 2018, the contents of which are all hereby incorporated by reference herein in their entirety.

BACKGROUND OF THE INVENTION

1. Field of the Invention

The present disclosure relates to a high frequency band antenna and a mobile terminal having the same.

2. Background of the Invention

Terminals may be divided into a mobile terminal (mobile/portable terminal) and a stationary terminal according to whether the terminal may be moved. The mobile terminal may be divided into a handheld terminal and a vehicle mounted terminal according to whether the user may carry the mobile phone directly.

The functions of mobile terminals are diversified. For example, there are functions of data and voice communication, photographing and video shooting through a camera, voice recording, music file playback through a speaker system, and outputting an image or video to a display unit. Some terminals are equipped with an electronic game play function or a multimedia player function. In particular, modern mobile terminals may receive multicast signals that provide visual content such as broadcast, video or television programs.

As functions are diversified, terminals are implemented in the form of multimedia devices supporting composite functions such as photographing or video shooting, music or video file playback, playing games, receiving broadcast, and the like.

In addition to the above attempts, as wireless communication systems using an LTE communication technology have been commercialized, mobile terminal provide various services. In the future, it is anticipated that a wireless communication system using a 5G communication technology is commercialized to provide various services. Meanwhile, some of the LTE frequency bands may be allocated to provide a 5G communication service.

In this regard, the 5G communication technology uses the mmWave frequency band having a short wavelength, but if a metal is disposed nearby, radiation loss occurs in terms of frequency characteristics. Here, if a mobile terminal has a metal rim (a case of a metal) along a side surface thereof, it may be difficult to dispose an antenna to be adjacent to the side surface of the terminal. Thus, a new mechanism which may ensure performance of a 5G antenna although a case is formed of a metal may be considered.

SUMMARY OF THE INVENTION

The present disclosure is directed to solving the above-mentioned problems and other problems. An aspect of the detailed description is to ensure performance regarding a transmission antenna of a wireless signal having a short wavelength in a mobile terminal having a metal rim.

To achieve these and other advantages and in accordance with the purpose of this specification, as embodied and broadly described herein, the top or the bottom of a cover glass of a mobile terminal is bent and an antenna is disposed to be adjacent to the bent portion.

In a specific example, a mobile terminal having a front surface, a rear surface, and side surfaces includes: a cover glass allowing an electromagnetic wave to be transmitted therethrough; a case having a metal rim forming an appearance of the top or the bottom of the mobile terminal; and an antenna having a plurality of arrayed antenna patterns to radiate a beamformed transmission signal, wherein the antenna is disposed such that at least a portion thereof is adjacent to the metal rim, and the cover glass includes a planar portion disposed on the front surface or the rear surface and a bent portion bent from at least one end of the planar portion such that the transmission signal is radiated through the cover glass.

According to one aspect of the present invention, the case may include a base portion facing the cover glass, and the metal rim may be formed at the edge of the base portion. The metal rim may include a first side wall protruding from the edge of the base portion at the top or bottom of the mobile terminal and a second side wall protruding from the edge of the base portion at the side surfaces of the mobile terminal, and the first side wall may be shorter in length in a thickness direction of the terminal than the second side wall to support the bent portion.

According to one aspect of the present invention, a plurality of slots cutting a portion of the metal rim may be formed on the case, and the slots are filled with a non-metal member. The plurality of slots may include a first slot and a second slot spaced apart from each other in the first side wall, and the antenna patterns may be arrayed between the first slot and the second slot. A portion between the first slot and the second slot in the metal rim may be an antenna pattern transmitting a wireless signal of a frequency band different from the antenna.

According to one aspect of the present invention, the bent portion may include a first bent region and a second bent region respectively formed at both ends of the planar portion, and the antenna patterns may be disposed to face any one of the first bent region and the second bent region.

The cover glass may have longer left side and right side and shorter upper side and lower side, and the first bent region and the second bent region may be bent from the upper side and the lower side, respectively. The first bent region and the second bent region may be opaque.

According to one aspect of the present invention, the antenna may include a flexible circuit board, and the flexible circuit board may have a first portion disposed to be parallel to the planar portion and a second portion bent from the first portion and facing the metal rim.

The flexible circuit board may further include a third portion bent from the second portion and extending to be parallel to the planar portion of the cover glass, and the antenna patterns may be disposed to cover the third portion to radiate the transmission signal to the front surface.

The antenna patterns may be disposed in a bent portion between the second portion and the third portion. The bent portion may be positioned to face the bent portion of the cover glass.

According to one aspect of the present invention, the first portion of the flexible circuit board may be disposed in the base portion of the case, and the case may have a through region through which the second portion of the flexible circuit board penetrates.

According to one aspect of the present invention, the mobile terminal may further include a mounting member allowing an electronic component to be mounted thereon and formed of a non-metal material, wherein the mounting member may have an appearance forming portion disposed between the metal rim and the bent portion of the cover glass. The antenna patterns may be disposed to cover an inner wall of the appearance forming portion and an inner wall of the bent portion.

According to one aspect of the present invention, the antenna may include an insulating member having a front surface, a rear surface, and a side surface and an electronic element disposed on the front surface or the rear surface of the insulating member, and the antenna patterns may be arrayed on the side surface of the insulating member. The side surface of the insulating member may face the bent portion of the cover glass.

Also, in the present invention, the plurality of antenna patterns are arrayed along one end of the mobile terminal at a position adjacent to the bent portion of the cover glass.

More specifically, a mobile terminal having a front surface, a rear surface, and side surfaces includes: a cover glass having a planar portion disposed on the front surface or the rear surface and a bent portion bent from at least one end of the planar portion; a case having a metal rim forming an appearance of the top or the bottom of the mobile terminal; and an antenna having a plurality of arrayed antenna patterns, wherein the antenna is disposed to be adjacent to the metal rim, and the antenna patterns are disposed to be adjacent to the bent portion to prevent a wireless signal of the antenna from being blocked by the metal rim. According to one aspect of the present invention, the antenna patterns may be arrayed along the top or the bottom of the mobile terminal.

Advantages of the mobile terminal according to the present disclosure is as follows.

According to at least one of the embodiments of the present disclosure, an influence of a case formed of a metal on antenna performance may be suppressed.

In addition, according to at least one of the embodiments of the present disclosure, an antenna structure capable of radiating a wireless signal having a short wavelength may be realized although a 5G mmWave antenna is disposed to be adjacent to a metal rim of a mobile terminal. Thus, 5G communication services may be provided, without damaging a region of the metal rim of the case of the metal material.

Further, according to at least one of the embodiments of the present disclosure, the metal rim may be used as an LTE antenna and the 5G mmWave antenna may be disposed to be adjacent to the metal rim, whereby a hybrid communication service of LTE/5G may be provided in the compact terminal structure.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 10 is an exploded perspective view illustrating a mobile terminal according to another embodiment of the present disclosure.

DETAILED DESCRIPTION OF THE INVENTION

Figure 1A:
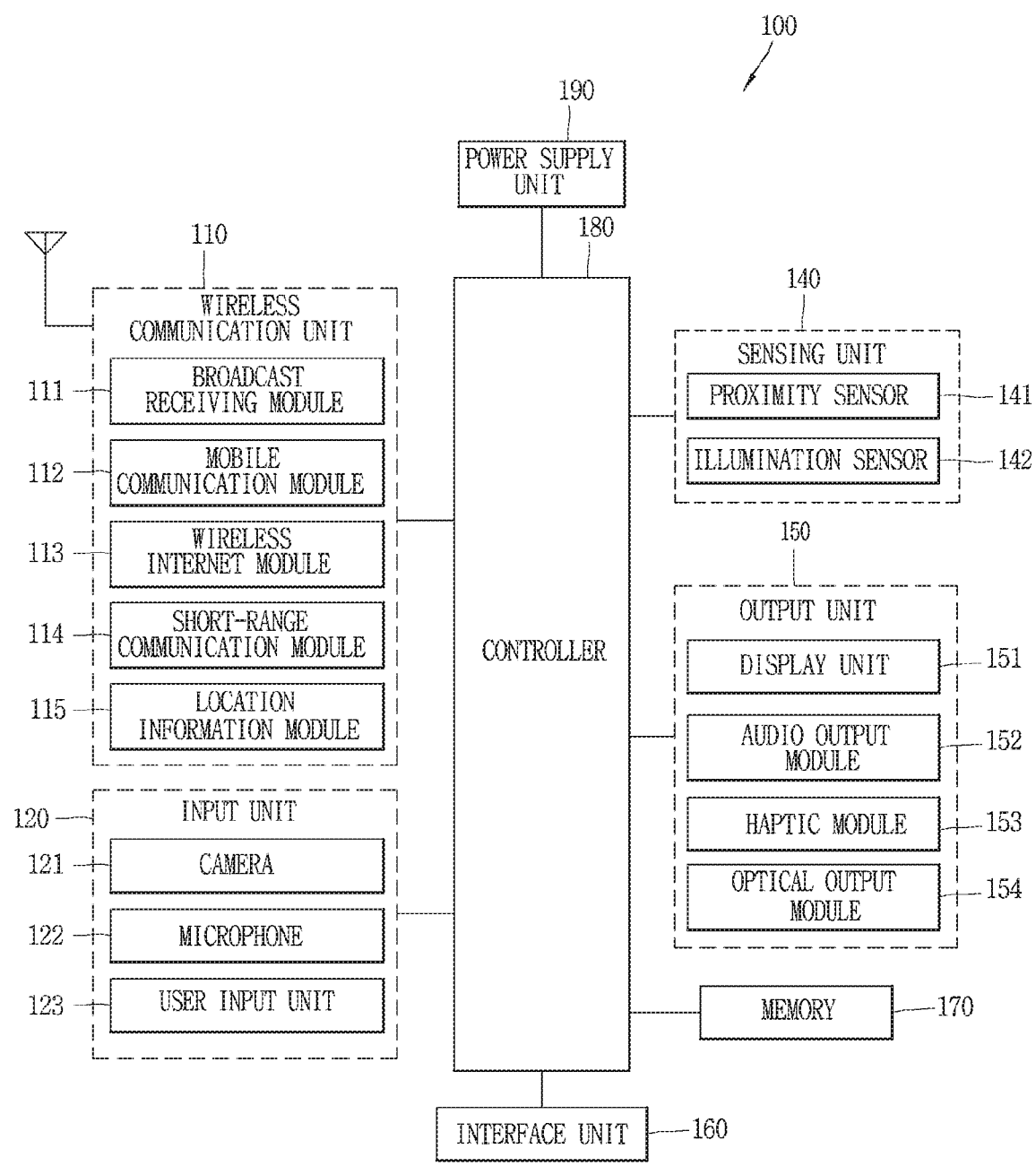
FIG. 1A is a block diagram illustrating a mobile terminal related to the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
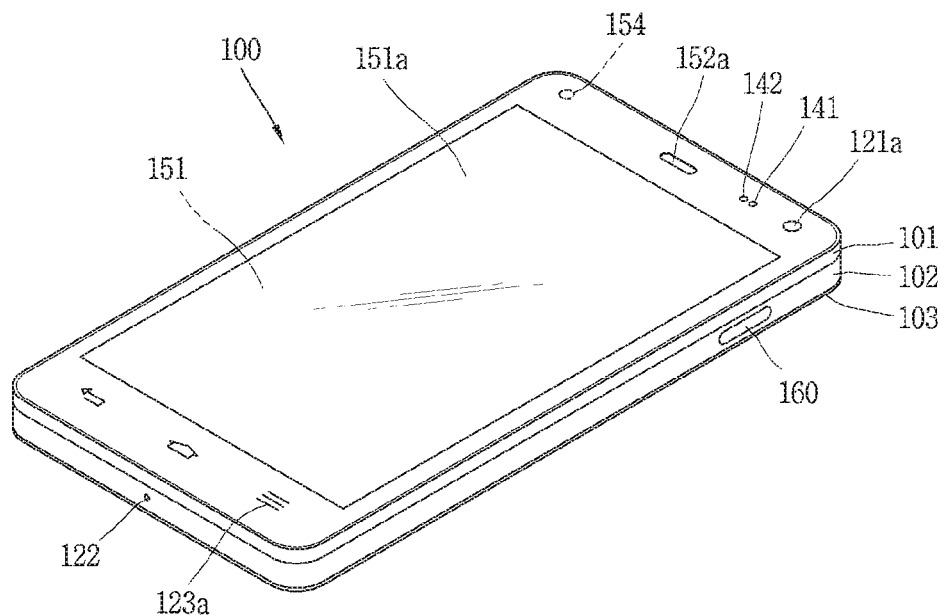
FIGS. 1B and 10 are conceptual views illustrating an example of a general mobile terminal in different directions.
Figure 1C:
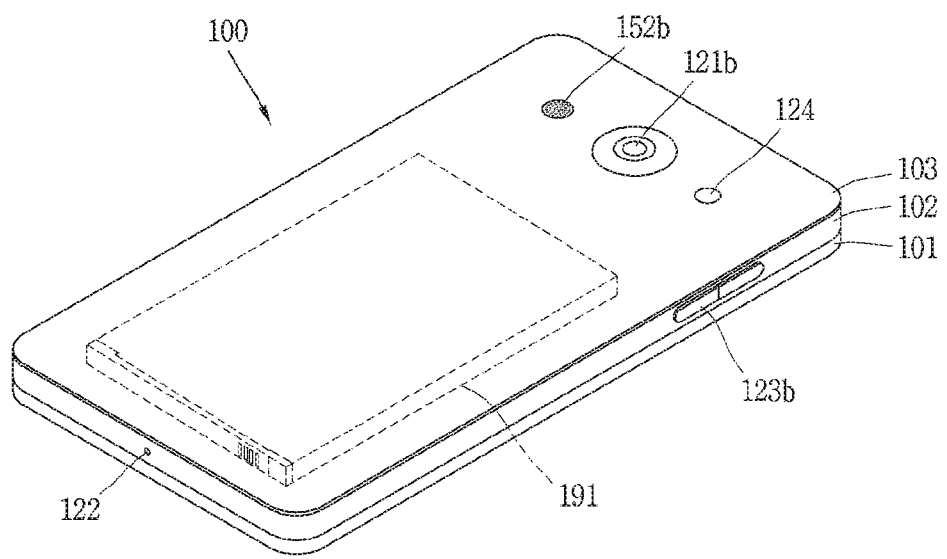
Figure 10:
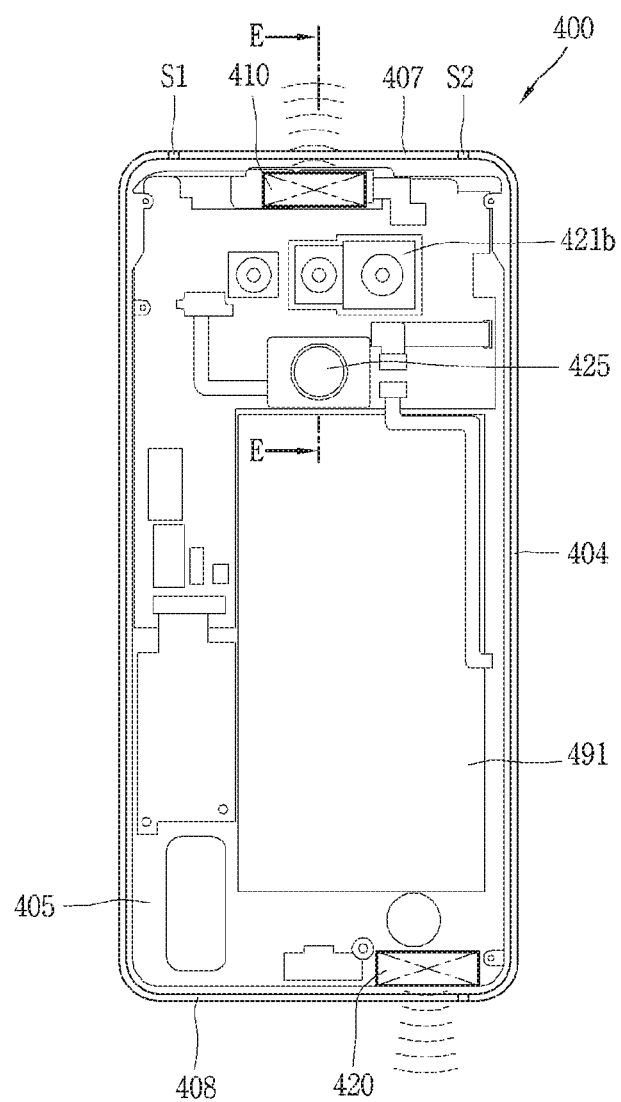

Reference is now made to FIGS. 1A-1C, where FIG. 1A is a block diagram of a mobile terminal in accordance with the present disclosure, and FIGS. 1B and 10 are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit or controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels. The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal. The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 10, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 10. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the control unit 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The control unit 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear cover 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, a wireless communication system using a 5G communication technology may be applied to the mobile terminal described above. Hereinafter, the wireless communication system will be described in detail. In particular, in the present disclosure, a mechanism for preventing radiation loss of a wireless signal using a bent glass cover is applied. Hereinafter, a mobile terminal 100 having an antenna pattern for radiating a wireless signal having a short wavelength according to an embodiment of the present disclosure will be described with reference to the drawings.

Figure 2A:
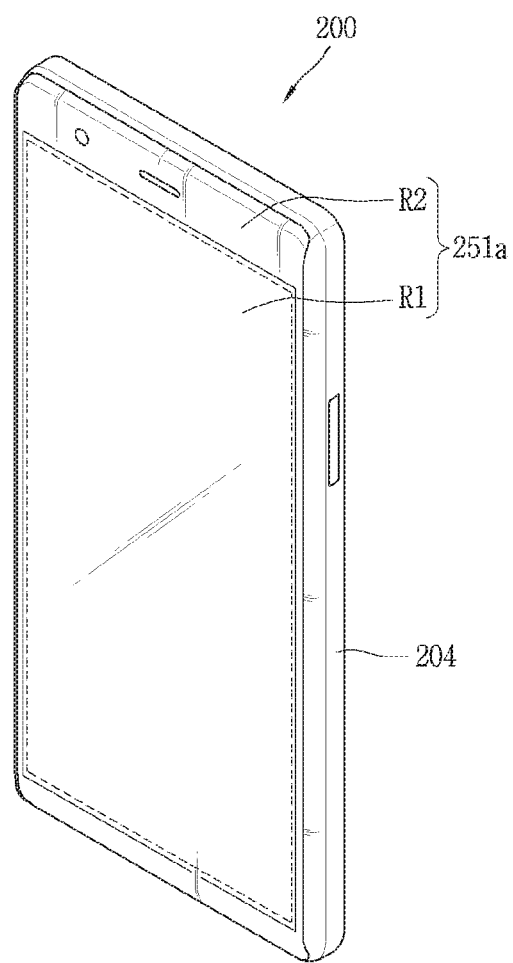
FIGS. 2A and 2B are conceptual views illustrating an example of a mobile terminal having a bent cover glass in different directions according to the present disclosure.
Figure 2B:
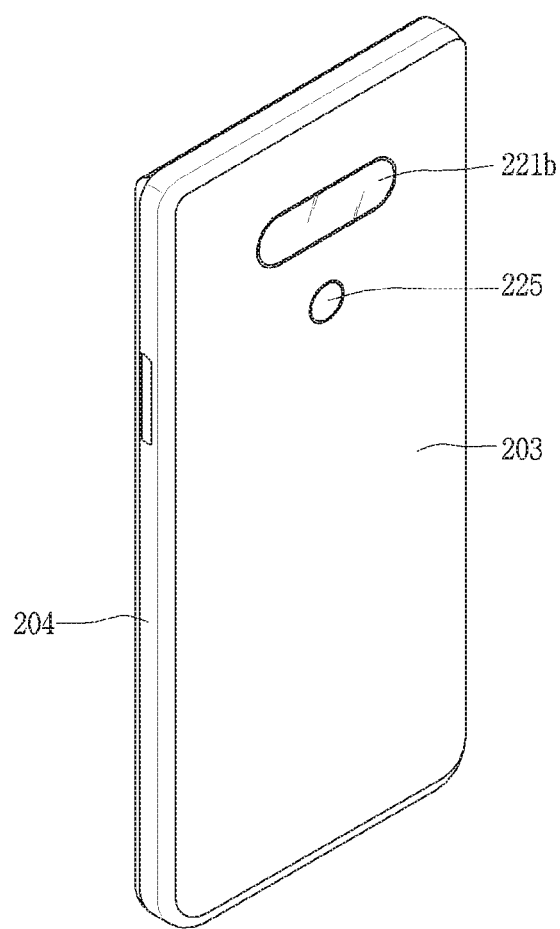
Figure 3:
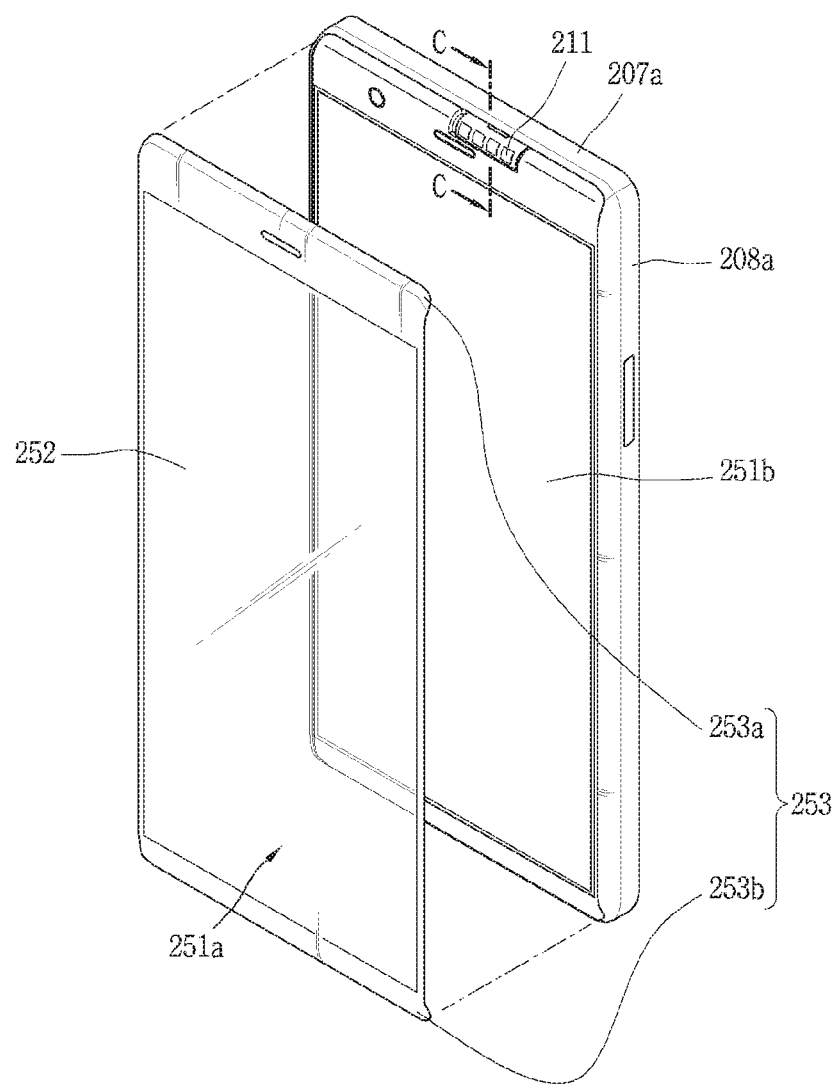
FIGS. 3 and 4 are exploded perspective views of the mobile terminal of FIG. 2.
Figure 4:
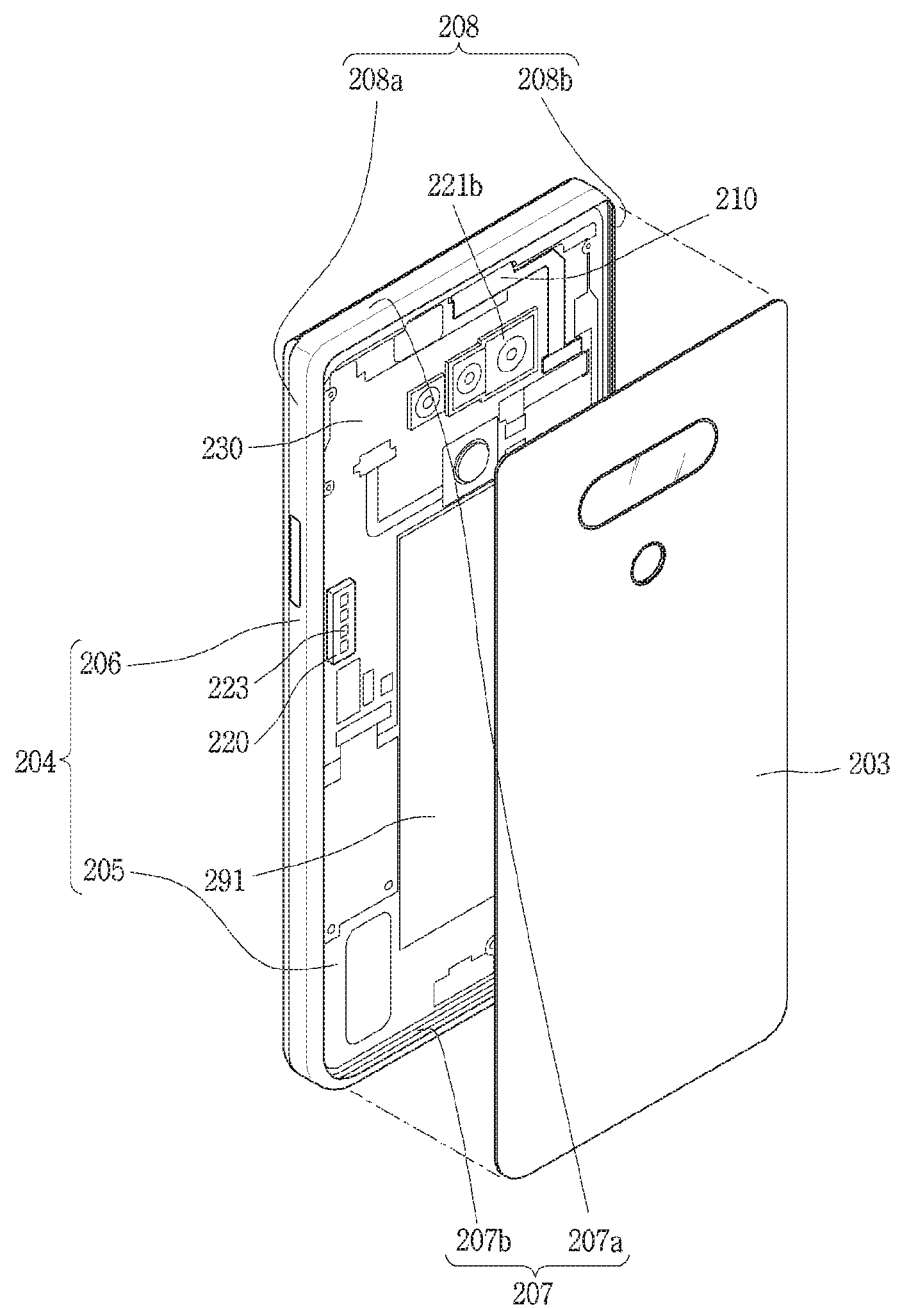
Figure 5:
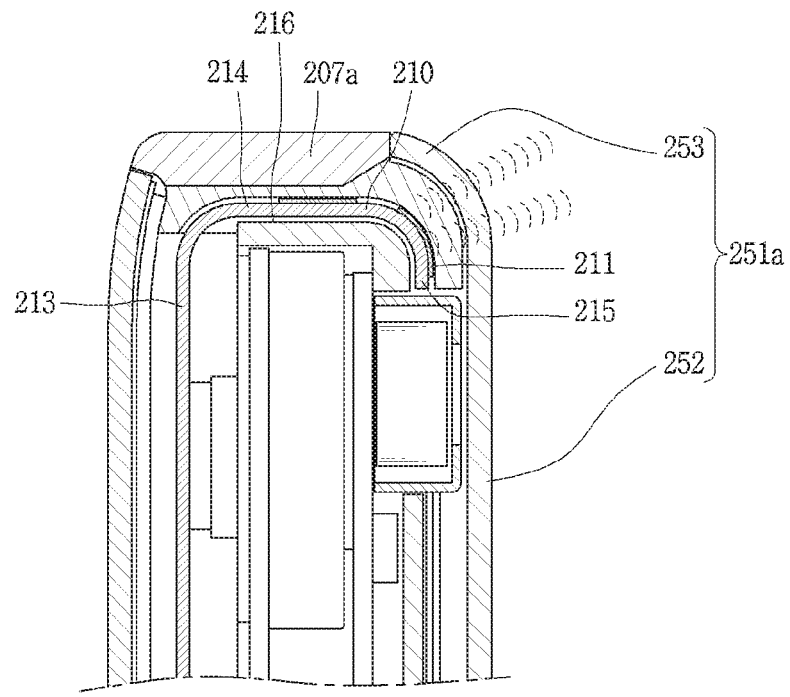
FIG. 5 is a cross-sectional view taken along line C-C of FIG. 3.
Figure 6:
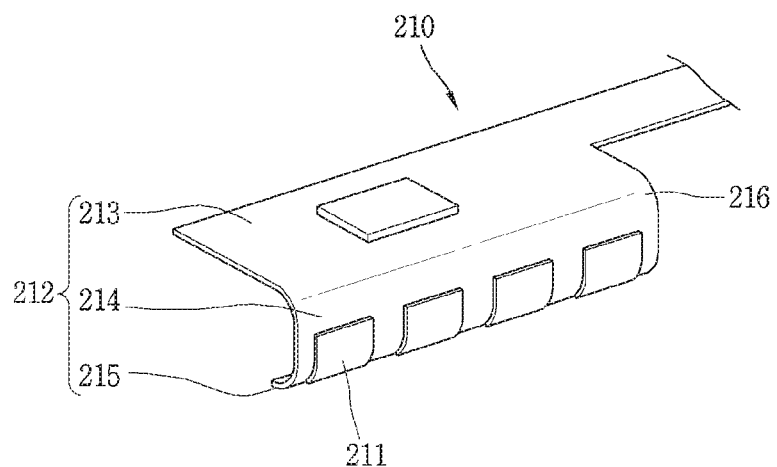
FIG. 6 is an enlarged view of an antenna of FIG. 3.

FIGS. 2A and 2B are conceptual views illustrating an example of a mobile terminal having a bent cover glass in different directions according to the present disclosure, FIGS. 3 and 4 are exploded perspective views of the mobile terminal of FIG. 2, FIG. 5 is a cross-sectional view taken along line C-C of FIG. 3, and FIG. 6 is an enlarged view of an antenna of FIG. 3.

As illustrated in FIGS. 2A and 2B, in an embodiment of the present disclosure, it is illustrated that a case is integrally formed. However, the present disclosure is not limited thereto and, as illustrated in FIGS. 1B and 10, an appearance of a mobile terminal 200 may be configured by the front case 101, the rear case 102, and the rear cover 103.

The mobile terminal 200 according to an embodiment of the present disclosure includes a case 204 that forms an appearance of a terminal body, and the case 204 is disposed under the cover glass 251a. The cover glass 251a may be the window 151a of the display unit 151 described above and may form a front surface of the terminal body. The cover glass 251a may be formed of tempered glass. However, the present disclosure is not limited thereto, and any other material such as a synthetic resin may also be used as long as it is a transparent material allowing visual information to be transmitted therethrough, while covering the display.

A rear cover 203 may be mounted on the rear surface of the case 204. The cover glass 251a and the rear cover 203 are accommodated on the front side and the rear side of the case 204, respectively, and an internal space is formed between the cover glass 251a and the rear cover 203 and the case 204.

A plurality of components such as a display module 251b may be formed on the front side of the case 204, among the internal spaces. The above-described display unit 151 includes the cover glass 251a and the display module 251b.

As illustrated in FIG. 2A, the cover glass 251a includes a transparent region R1 for displaying visual information toward the outside and an opaque region R2 for surrounding the transparent region R1. The opaque region R2 forms a bezel area. For example, a print layer may be formed on a lower surface of the opaque region R2, and visual information displayed on the display module 251b may not be visible from the outside due to the print layer.

Other electronic components may be mounted on the rear side of the case 204. Electronic components that may be mounted on the case 204 include a detachable battery 291, an identification module, a memory card, and the like. In this case, the rear cover 203 may be coupled to the rear surface of the case 204 to cover the mounted electronic components.

The rear cover 203 is formed so as to cover the rear surface of the terminal 200 except for a region exposing a component such as a rear input unit 225, a flash, a camera 221b, or an audio output unit.

A rear input unit 225 is formed on the rear surface of the terminal body. The rear input unit 225 may be exposed to the rear surface of the terminal body and may perform a function related to ON/OFF of power or activation of the display unit 251, a function related to adjustment of magnitude of a sound output from the terminal body, or a scroll function regarding output information of the display unit 251. Also, in another example, the rear input unit 225 may serve as a fingerprint sensor for recognizing a user's fingerprint to perform user authentication.

As for the case 204, the front case 101 and the rear case 102 described above with reference to FIGS. 1B and 10 are integrally configured. The case 204 may be formed of a metal material and may also be referred to as a metal case.

As illustrated, when the cover glass 251a and the rear cover 203 are disposed on the front surface and the rear surface of the case 204, respectively, a portion of the side surface of the case 204 may be exposed to the outside. As described above, since the case 204 is formed of a metal material, the case 204 may have sufficient rigidity although it is formed to have a small thickness, and thus, the case 204 may be a frame.

Here, the case 204 may have a metal rim 206. The metal rim 206 forms a side surface of the mobile terminal and connects the front surface and the rear surface of the mobile terminal. The metal rim 206 may be formed of a metal material.

More specifically, the case 204 may have a base portion 205 facing the cover glass 251a, and the metal rim 206 may be formed at the edge of the base portion 205.

The base portion 205 may be a portion parallel to the front and rear surfaces of the mobile terminal and may have a front side facing the front surface and a rear side facing the rear surface. The metal rim 206 may be disposed in a direction perpendicular to the base 205 to support the cover glass 251a at the front side and the rear cover 203 at the rear side. Here, supporting may not only mean abutment but may also be referred to as being combined (or assembled) with each other.

More specifically, the display module 251b may be accommodated on the front side of the base portion 205, and the metal rim 206 may extend along the edge of the base portion 205 to form a side wall on the side of the base portion 205.

The metal rim 206 may include a first side wall 207 disposed on the top or bottom of the mobile terminal and a second side wall 208 disposed at the side surfaces of the mobile terminal. Here, the first side wall 207 may include an upper end portion 207a positioned on the top of the mobile terminal and a lower end portion 207b positioned on the bottom of the mobile terminal. The second side wall 208 may include side end portions 208a and 208b positioned on both side surfaces of the mobile terminal.

The upper end portion 207a and the lower end portion 207b extend in one direction between the side surfaces of the mobile terminal to form an appearance of the top or bottom of the mobile terminal. The side end portions 208a and 208b are disposed as a pair between the upper end portion and the lower end portion to form side surfaces of the mobile terminal. As illustrated, the upper end portion 207a and the lower end portion 207b of the metal rim 206 are shorter than the side end portions 208a and 208b in the present embodiment.

Referring to these drawings, the mobile terminal includes an antenna 210 having a plurality of arrayed antenna patterns so that a beam-formed transmission signal is radiated. Also, at least a portion of the antenna 210 is disposed to be adjacent to the metal rim 206 and radiates a wireless signal to the outside through the cover glass 251a through which electromagnetic waves are transmitted.

In this case, the cover glass 251a includes a planar portion 252 disposed on the front surface of the mobile terminal and a bent portion 253 bent from at least one end of the planar portion 252 such that a transmission signal from the antenna is radiated through the cover glass 251a.

The bent portion 253 may include a first bent region 253a and a second bent region 253b formed at both ends of the planar portion. Here, the first bent region 253a and the second bent region 253b are opaque. As described above, the cover glass 251a includes an opaque region R2 surrounding the transparent region R1, and the first bent region 253a and the second bent region 253b may be included in the opaque region R2. That is, the entire region of the bent portion 253 may be included in the opaque region R2.

In this example, unlike the structure in which an edge portion of a window bent from the front surface of the mobile terminal toward the side surface to form at least a portion of the side surface is utilized as a display, the cover glass 251a is bent from the top or bottom of the mobile terminal, and the bent portions form an opaque bezel area.

More specifically, the cover glass 251a has longer left and right sides and shorter upper and lower sides, and the first bent region 253a and the second bent region 253b may be bent from the upper side and the lower side, respectively. In addition, since the window is not bent from the left and right sides of the cover glass 251a, a height of the metal rim 206 supporting the edge of the window may vary along the circumference. Here, the height refers to a length of the terminal in the thickness direction. In an example, the first side wall 207 of the case is formed to have a shorter length in the thickness direction of the terminal than the second side wall 208 to support the bent portion 253.

As illustrated, antenna patterns 211 of the antenna 210 may be disposed to face any one of the first bent region 253a and the second bent region 253b. In order to allow a wireless signal to be transmitted and received at the first bent region 253a and the second bent region 253b, a touch sensor (not shown) and the display module 251b are configured not to cover the first bent region 253a and the second bent region 253b. That is, the touch sensor and the display module 251b are not bent, and only the window is bent on the top or bottom. In this embodiment, the antenna patterns 211 are arranged at the first bent region 253a.

In this case, the antenna 210 may be an array antenna operating in a millimeter wave band of 3.5 GHz or higher, and a beam-formed wireless signal is output through the antenna 210. The antenna may be a 5G antenna having an L shape. However, the present disclosure is not limited thereto, and the array antenna may be able to output any other type of wireless signal. For convenience of description, an array antenna outputting a beam-formed wireless signal will be described hereinafter.

The antenna 210 includes a flexible circuit board 212, and the flexible circuit board 212 may include a first portion 213 and a second portion 214. The first portion 213 is disposed to be parallel to the planar portion 252 of the cover glass 251a and the second portion 214 is bent from the first portion 213 to face the metal rim 206. The first portion 213 of the flexible circuit board may be disposed on the base portion 205 of the case 204 and, here, the first portion 213 may be disposed on the rear side of the base portion 205. For example, the first portion 213 may be disposed between the rear camera 221b of the mobile terminal and the upper end portion of the case 204.

The case 204 has a through region 216 through which the second portion 214 of the flexible circuit board 212 passes, and the second portion is bent toward the front surface of the terminal from the first portion through the through region 216. The through region 216 may be a through hole penetrating through the base portion 205 of the case or a cutout hole formed by cutting out a portion of the base portion 205.

The flexible circuit board 212 may have a third portion 215 bent from the second portion 214 and extending parallel to the planar portion 252 of the cover glass 251a. The antenna patterns 211 are disposed to cover the third portion 215 to radiate the transmission signal to the front surface. For example, the flexible circuit board 212 may be provided with the antenna patterns 211 radiating a wireless signal to a front surface or a side surface of the mobile terminal. The antenna patterns 211 may be arranged in various forms such as 1×4, 2×2, and 2×4, and is formed of an array antenna to transmit a beam-formed wireless signal. The antenna patterns 211 may be disposed in the third portion 215 or may be disposed in a bent portion 216 between the second portion 214 and the third portion 215. The antenna patterns 211 may be sequentially arranged along a bending line (bending reference line) of the bent portion 216. In this case, the bent portion may be disposed to face the bent portion 253 of the cover glass 251a. In case where the antenna patterns 211 are arranged at the bent portion 216 between the second portion 214 and the third portion 215, the antenna patterns 211 may be formed such that at least portions thereof are curved.

Here, the third portion 215 and the bent portion 216 may each be disposed below the opaque region R2 of the cover glass 251a. Therefore, a radiation direction of a transmission signal of the antenna patterns 211 is a diagonal or forward direction, and the transmission signal may be transmitted to the outside through the opaque region R2 of the cover glass 251a.

A main circuit board 230 is electrically connected to the antenna patterns and processes transmitted or received wireless signals (or radio electromagnetic waves). In order to process the wireless signal, a plurality of transmission/reception circuits may be formed or mounted on the main circuit board 230. The transceiver circuits may include one or more integrated circuits and related electrical components. For example, the transceiver circuits may include a transmission integrated circuit, a reception integrated circuit, a switching circuit, an amplifier, and the like. Some of the transceiver circuits may be mounted on the flexible circuit board 212. For example, a power inductor, an SR module, or the like, may be disposed in the first portion 213.

In another example, antenna patterns radiating a wireless signal to the rear surface of the mobile terminal may be arranged in the first portion 213 of the flexible circuit board 212, apart from the antenna patterns described above. In this case, each antenna pattern may be formed to transmit and receive wireless signals of different frequency bands, and wireless signals may be transmitted to and received from the front and rear sides of the terminal, respectively.

Meanwhile, the mobile terminal of this example may further include another antenna (hereinafter, referred to as a 'second antenna') different from the antenna described above (hereinafter, referred to as 'first antenna'). For example, the second antenna 220 may be disposed to be adjacent to the side of the terminal.

The second antenna 220 may be an array antenna operating in a millimeter wave band of 3.5 GHz or higher, and a beamformed wireless signal is output through the array antenna. Also, the second antenna may be a 5G antenna of mmWave dipole module type.

Figure 12:
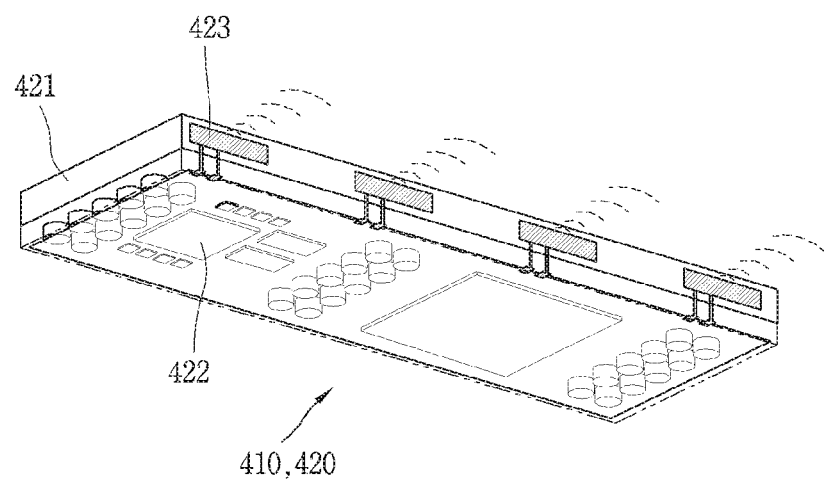
FIG. 12 is an enlarged view illustrating an antenna of FIG. 10.

More specifically, the second antenna 220 includes an insulating member 421 (See FIG. 12) and an electronic element 422 (See FIG. 12). The insulating member 421 has a front surface, a rear surface, and a side surface, and the electronic element 422 may be disposed on the front surface or the rear surface of the insulating member 421. Antenna patterns 223 may be arrayed on the front surface or the rear surface of the insulating member 421.

The second antenna 220 may be disposed such that the front surface or the rear surface thereof faces the rear cover 203. In this case, the side surface of the second antenna 220 is disposed to be parallel with the metal rim 206. A beamformed wireless signal may be radiated through the rear cover to the rear surface of the terminal by the antenna patterns arrayed on the front or rear surface of the second antenna 220

In case where the case 204 forming the side surface of the terminal 200 is formed of metal, in order to solve the problem of disposing the antenna patterns, in this embodiment, radiation by the antenna patterns is made to the front surface, or to the boundary portion between the front surface and the side surface, as well as to the rear surface of the terminal 200. Further, if the antenna patterns are formed adjacent to the metal material, performance of the antenna may be adversely affected. Therefore, in this embodiment, in order to separate the antenna patterns from the case of the metal material, as far as possible, the bent portion is formed on the top of the cover.

The structure of the antenna of the high frequency band and the mobile terminal having the antenna described above may be modified into various forms. For example, the high-frequency band antenna described above may also be applied to a case where the case is divided into a plurality of cases, such as the mobile terminal illustrated in FIGS. 1B and 10. Hereinafter, a mobile terminal having a high frequency band antenna and a plurality of cases will be described with reference to FIGS. 7 to 9.

In the modifications or embodiments described below, the same or similar reference numerals are given to the same or similar components as those of the previous example, and the description is replaced with the first explanation.

Figure 7:
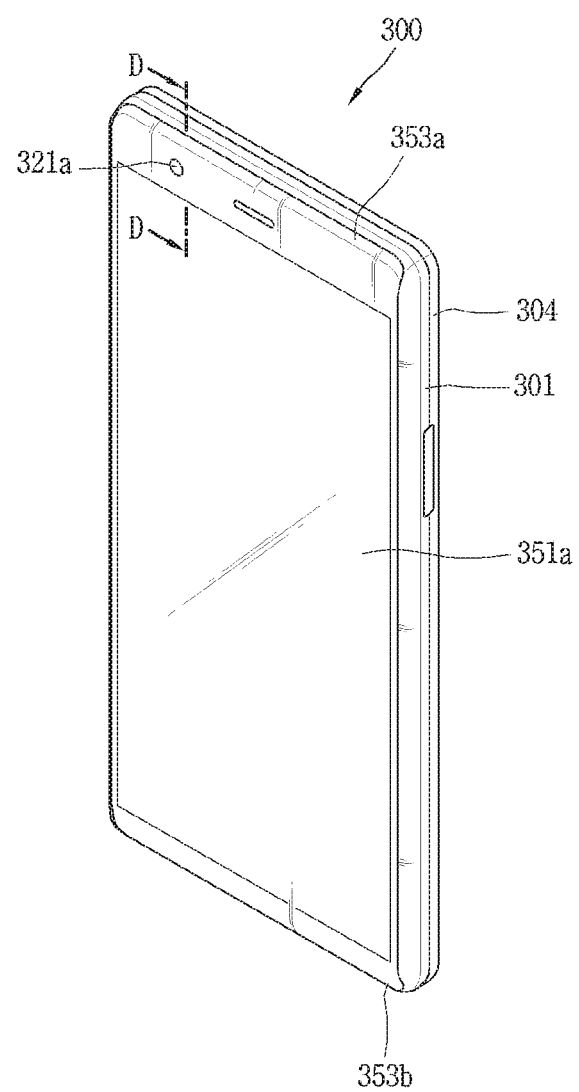
FIG. 7 is a conceptual view illustrating a mobile terminal according to another embodiment of the present disclosure.
Figure 8:
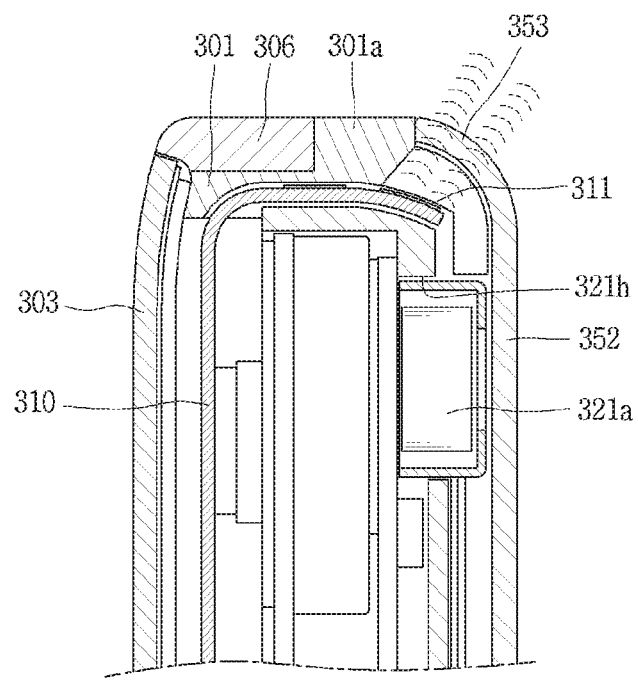
FIG. 8 is a cross-sectional view taken along line D-D of FIG. 7.
Figure 9:
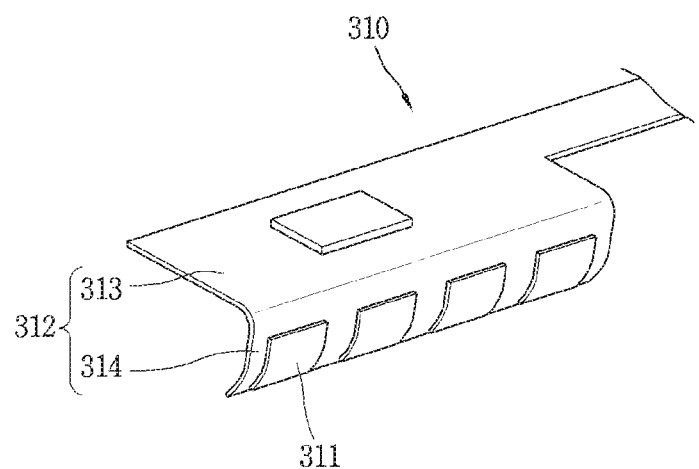
FIG. 9 is an enlarged view illustrating an antenna of FIG. 8.

FIG. 7 is a conceptual view illustrating a mobile terminal according to another embodiment of the present disclosure, FIG. 8 is a cross-sectional view taken along line D-D of FIG. 7, and FIG. 9 is an enlarged view illustrating an antenna of FIG. 8.

Referring to these drawings, the mobile terminal includes a mounting member 301, on which electronic components are mounted, formed of a non-metallic material. The mounting member 301 is exposed to the outside so as to form an appearance of a side surface of the terminal.

The mounting member 301 is disposed below a cover glass 351a and serves as the front case 101 described above. The cover glass 351a may be the window 151a (See FIG. 1B) of the display unit 151 (See FIG. 1B) and may form a front surface of the terminal body. The cover glass 351a may be formed of tempered glass. However, the present disclosure is not limited thereto, and any other material such as a synthetic resin may be used as long as it is a transparent material allowing visual information to be transmitted therethrough, while covering the display.

In this case, the mounting member 301 may be formed of a synthetic resin material, and the cover glass 351a and a display module (not shown) may be accommodated on the front side of the mounting member 301. A camera 321a is disposed on the rear side of the mounting member 301 and a camera hole 321h corresponding to the camera 321a is formed on the mounting member 301 so that the camera 321a faces the front side.

A case 304 formed of a metal material is disposed on the rear surface of the mounting member 301. The case 304 may be formed of a metal material and may be referred to as a metal case. Here, the case 304 may have a metal rim 306. The metal rim 306 is a surface forming a side surface of the mobile terminal and may be formed of a metal material. The metal rim 306 may extend along the edge of the case 304 to form a metal rim of the mobile terminal. Like the example described above with reference to FIGS. 2A to 6, the metal rim 306 may include a first side wall disposed on the top or bottom of the mobile terminal, and a second side wall disposed on the side surfaces of the mobile terminal. Here, the first side wall may include an upper end portion positioned on the top of the mobile terminal and a lower end portion positioned on the bottom of the mobile terminal, and the second side wall may include side end portions positioned on both side surfaces of the mobile terminal.

As illustrated, the mounting member 304 may have an appearance forming portion 301a disposed between the metal rim 306 of the case and the bent portion 353 of the cover glass 351a. The appearance forming portion 301a protrudes from the one side of the mounting member 301 to the outside of the terminal. An edge of the cover glass 351a may be disposed on the front side of the appearance forming portion 301a and the metal rim 306 of the case 304 may be disposed on the rear side of the appearance forming portion 301a.

The front edge of the appearance forming portion 301a may be disposed at the edge of the cover glass 351a and the rear edge of the appearance forming portion 301a may be disposed at the metal rim 306 of the case 304.

The case 304 is provided as the rear case 102 (See FIG. 1B), and a rear cover 303 may be mounted thereon.

The rear cover 303 covers the rear surface of the terminal 300 except for an area exposing the components such as a rear input unit, a flash, a rear camera, and an audio output unit.

The cover glass 351a, the mounting member 301, the case 304, and the rear cover 303 form an appearance of the mobile terminal. The appearance of the mobile terminal may be formed by the cover glass 351a in the front surface, by the appearance forming portion 301a of the mounting member 301 and the metal rim 306 of the case 304 in the side surface, and by the rear cover 303 in the rear surface.

Like the example described above with reference to FIGS. 2A to 6, the cover glass 351a may include a planar portion 352 disposed on the front surface of the mobile terminal and a bent portion 353 bent from at least one end of the planar portion 352 such that a transmission signal from the antenna may be radiated through the cover glass 351a.

The bent portion 353 may include a first bent region 353a and a second bent region 353b formed at both ends of the planar portion 352, respectively. Here, the first bent region 353a and the second bent region 353b are opaque. As described above, the cover glass 351a includes the opaque region R2 surrounding the transparent region R1 (See FIG. 2A), and the first bent region 353a and the second bent region 353b may be included in the opaque region R2 (See FIG. 2A). That is, the entire region of the bent portion 353 may be included in the opaque region R2.

In this case, an array antenna operating in a millimeter wave band of 3.5 GHz or higher may be disposed to be adjacent to the top or bottom of the terminal. That is, antenna patterns 311 of an antenna 310 may be arranged to face any one of the first bent region 353a and the second bent region 353b. In order to allow a wireless signal to be transmitted and received in the first bent region 353a and the second bent region 353b, the touch sensor and the display module may be configured not to cover the first bent region 353a and the second bent region 353b.

In this embodiment, the antenna patterns are arranged in the first bent region 353a. More specifically, the antenna patterns 311 may be disposed to cover an inner wall of the appearance forming portion 301a and an inner wall of the bent portion 353.

The antenna 310 may have a flexible circuit board 312, and the flexible circuit board 312 may include a first portion 313 and a second portion 314. The first portion 313 may be disposed between the camera 321a of the mobile terminal and the upper end portion of the case. The second portion 314 is bent from the first portion 313 toward the front surface of the terminal to cover the front camera 321a and is disposed to face the side surface of the terminal. Unlike the example described above with reference to FIGS. 2A to 6, the antenna of this example may have only the first portion 313 and the second portion 314 without a third portion.

As illustrated, the second portion 314 is formed such that at least a portion thereof is curved. For example, the antenna patterns 311 are disposed in the second portion 314, and the second portion 314 is curved to have a shape corresponding to the bent portion 353 of the cover glass. Accordingly, the antenna patterns 311 may transmit and receive wireless signals through the appearance forming portion 301a and the bent portion 353. More specifically, wireless signals are transmitted and received through the front and side surfaces of the mobile terminal between the top of the mobile terminal and the front camera.

However, the present disclosure is not limited to the configuration in which the window is bent on the top or bottom. For example, bent portions may be formed on both sides of the window and the antenna patterns 211 and 311 described above with reference to FIGS. 2A to 9 may be disposed to be adjacent to any one of both sides of the mobile terminal. Also, here, the bent portion may be formed only in a portion of the window, rather than in the entire side surface of the window. In this case, the touch sensor (not shown) and the display module are configured not to cover the bent portion. That is, the touch sensor and the display module are not bent, and only the window may be bent from both sides of the terminal.

In addition, in case where the bent portion is formed only in a portion of the window, rather than in the entire side surface of the window, a metal material may be printed on the bent portion or the bent portion may be covered with a synthetic resin material. In case where the synthetic resin material covers the bent portion to form a synthetic resin layer, a printed layer having a metal texture may be applied to the synthetic resin layer. Accordingly, the bent portion may be integrally formed with the nearby metal rim.

Although the case where the window in the front surface of the mobile terminal is bent has been mainly described, but various modifications may also be made. For example, a structure in which the rear cover of the mobile terminal is bent may be considered.

A mobile terminal in which a cover glass is mounted on a rear surface thereof and the cover glass is bent will be described with reference to FIGS. 10 to 12.

Figure 11:
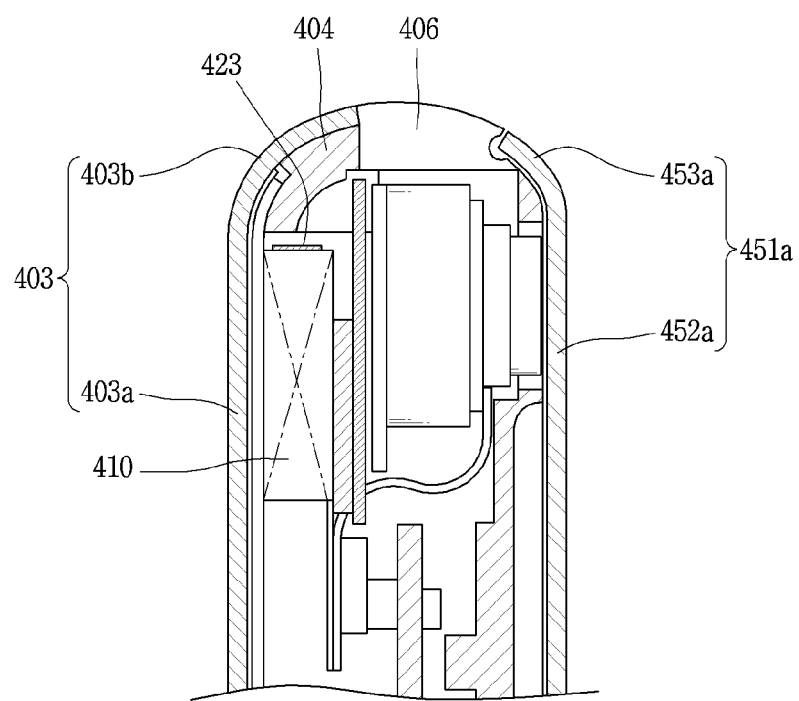
FIG. 11 is a cross-sectional view taken along line E-E of FIG. 10.

FIG. 10 is an exploded perspective view illustrating a mobile terminal according to another embodiment of the present disclosure, FIG. 11 is a cross-sectional view taken along line E-E of FIG. 10, and FIG. 12 is an enlarged view illustrating an antenna of FIG. 10.

Referring to these drawings, a mobile terminal 400 includes a case 404 which forms an appearance of a terminal body, and the case 404 includes the front case 101 and the rear case 102 described above with reference to FIGS. 1B and 10, which are integrally formed. The case 404 may be formed of a metal material and may be referred to as a metal case.

Cover glasses 451a and 403 may be mounted on the front and rear surfaces of the case, respectively. Hereinafter, for convenience of explanation, the cover glasses will be referred to as a first cover glass 451a and a second cover glass 403, respectively.

The cover glasses 451a and 403 may be formed of tempered glass.

However, the present disclosure is not limited thereto, and any other material such as a synthetic resin, or the like, may also be used as long as it is a transparent material, while being used as a case.

The first cover glass 451a may be the window described above with reference to FIGS. 1B to 6, and the second cover glass 403 may be the rear cover described above with reference to FIGS. 1B to 6. Accordingly, the first cover glass 451a and the second cover glass 403 are accommodated in the front side and the rear side of the case 404, respectively, and an internal space is formed between the first cover glass 451*a* and the second cover glass 403 and the case 404.

A plurality of components such as a display module may be formed on the front side of the case, among the internal spaces. The display unit 151 (See FIG. 1B) described above includes the first cover glass 451*a* and the display module 251*b* (See FIG. 3).

As described above, the first cover glass 451*a* includes the transparent region R1 for displaying visual information toward the outside and the opaque region R2 (See FIG. 2A) surrounding the transparent region R1, and the opaque region R2 forms a bezel area. For example, a print layer may be formed on the lower surface of the opaque region R2, and visual information displayed on the display module 251*b* (See FIG. 3) may not be visible from the outside due to the print layer.

Other electronic components may be mounted on the rear side of the case 404. The electronic components that may be mounted on the case 404 include a detachable battery 491, an identification module, a memory card, and the like. In this case, the second cover glass 403 may be coupled to the rear surface of the case 404 to cover the electronic components mounted on the case 404.

The second cover glass 403 is formed to cover the rear surface of the terminal 400, except for an area exposing components such as a rear input unit 425, a flash, a camera 421*b*, and an audio output unit.

Referring to these drawings, the case 404 may have a metal rim 406. The metal rim 406 forms a side surface of the mobile terminal, which connects the front surface and the rear surface of the mobile terminal. The metal rim 406 may be formed of a metal material.

More specifically, the case 404 may include a first cover class 451*a* and a base portion 405 parallel to the first cover glass 451*a*, and the metal rim 406 may be formed on the edge of the base portion 405.

The metal rim 406 is disposed in a direction perpendicular to the base portion 405 to support the first cover glass 451*a* on the front side of the case 404 and support the second cover glass 403 on the rear side of the case 404. Here, Here, supporting may not only mean abutment but may also be referred to as being combined (or assembled) with each other. In this case, the metal rim 406 may extend along the edge of the base portion 405 to form a metal rim of the mobile terminal.

The first cover glass 451*a* and the second cover glass 403 may include planar portions 452*a* and 403*a* disposed on the front or rear surface of the mobile terminal and bent portions 453*a* and 403*b* bent from at least one ends of the planar portions 452*a* and 403*a* such that a transmission signal from the antenna is radiated through the cover glass 451*a* and 403.

The bent portions 453*a* and 403*b* may have a first bent region and a second bent region (not shown) formed at both ends of the planar portions 452*a* and 403*a*, respectively.

More specifically, the first cover glass 451*a* and the second cover glass 403 each have a left side and a right side which are longer in length, an upper side and a lower side which are shorter in length, and the bent portions 453*a*, 403*b* may be bent from the upper side and the lower side, respectively. In this case, the lengths of the bent portions 453*a* and 403*b* of the first cover glass 451*a* and the second cover glass 403 may be different from each other. In this embodiment, in order to radiate wireless signals to the rear surface and the side surface, the length of the bent portion 403*b* of the second cover glass 403 is longer than the bent portion 453*a* of the first cover glass 451*a*.

As illustrated, the first antenna 410 and the second antenna 420 are disposed to be adjacent to the metal rim of the case and each have a plurality of antenna patterns 423 arranged thereon. The antenna patterns 423 may be disposed to be adjacent to the bent portion 403*b* of the second cover glass 403 to prevent the wireless signal of the first antenna 410 from being blocked by the metal rim of the case.

The first antenna 410 and the second antenna 420 are disposed to be adjacent to the metal rim of the case on the top and bottom of the mobile terminal, respectively, and radiate wireless signals to the outside through the second cover glass 403 through which electromagnetic waves are transmitted.

In detail, referring to FIG. 12, the first antenna 410 and the second antenna 420 each include an insulating member 421 and an electronic element 422. The electronic element 422 may be disposed on the front surface or the rear surface of the insulating member 421. The antenna patterns 423 may be arrayed on the side surfaces of the insulating member 421.

The side surface of the antenna 410, that is, the side surface of the insulating member 421, is disposed to face the bent portion of the second cover glass 403. In this case, the front surface or the rear surface of the antenna is disposed in parallel with the planar portion 403*a* of the second cover glass 403. A beamformed wireless signal may be radiated to the side surface of the terminal through the bent portion 403*b* by the antenna patterns 423 arrayed on the side surface of the antenna 410. Also, an antenna pattern different from the antenna pattern may be arranged on a front surface or a rear surface of the antenna 410, through which a wireless signal may be radiated to the rear surface of the terminal through the planar portion 403*a* of the second cover glass 403.

In this case, slots S1 and S2 may be formed in the metal rim 406. For example, the metal rim 406 may have an upper end portion 407 located on the top of the mobile terminal and a lower end portion 408 located on the bottom of the mobile terminal. The slots S1 and S2 may be spaced apart from each other at the upper end portion 407 or the lower end portion 408. The slots S1 and S2 are filled with a non-metal member, and the metal rim 406 has a metal member whose both ends are confined by the slots S1 and S2. However, the present disclosure is not limited thereto and may be applied to a metal rim without the slots. As illustrated, the first antenna 410 may be disposed such that antenna patterns are arranged between the slots S1 and S2. In this manner, when the case 404 forming the side surface of the terminal 400 is formed of metal, a mechanism in which the antenna radiates wireless signals from the rear surface and the side surface between the slots may be implemented.

So far, the high frequency band antenna and the mobile terminal having the same have been mainly described but the antenna may be modified into various forms. As an example, an antenna structure capable of providing multiple wireless communication of LTE and 5G may be considered.

Figure 13:
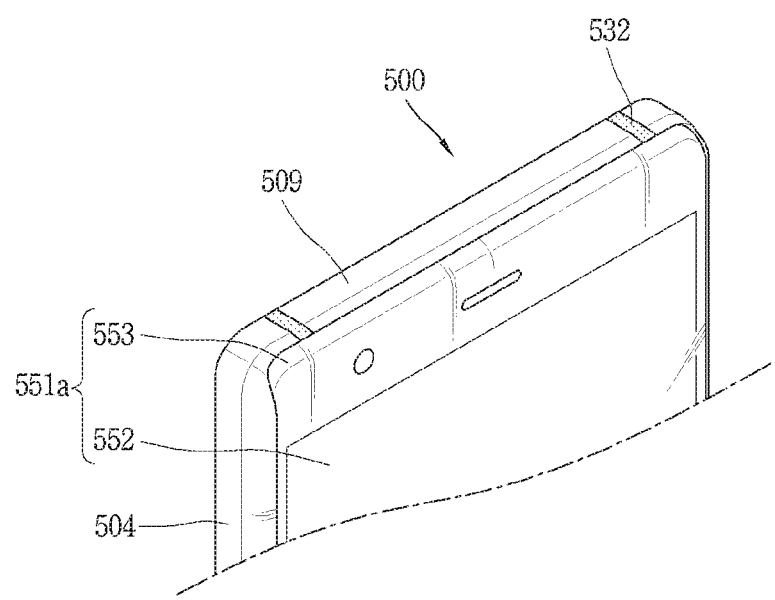
FIG. 13 is a conceptual view illustrating a mobile terminal according to another embodiment of the present disclosure.
Figure 14:
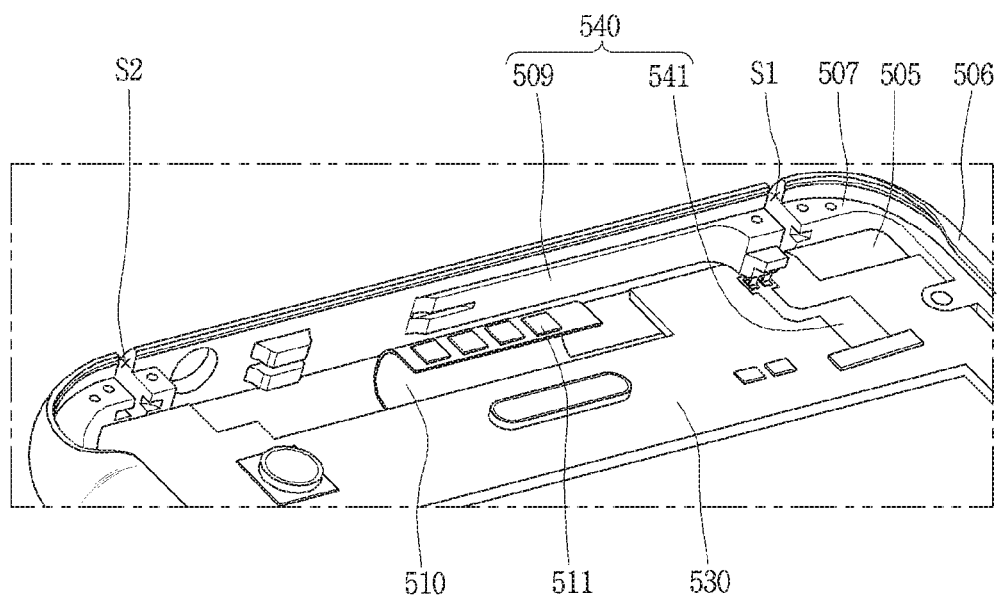
FIG. 14 is an exploded perspective view of the mobile terminal of FIG. 13.

Hereinafter, a mobile terminal in which a plurality of antennas operate in different frequency bands will be described with reference to FIGS. 13 and 14. FIG. 13 is a conceptual view illustrating a mobile terminal according to another embodiment of the present disclosure, and FIG. 14 is an exploded perspective view of the mobile terminal of FIG. 13.

Referring to these drawings, the mobile terminal 500 includes a case 504 which forms an appearance of the terminal body, and the case 504 includes the front case 101 and the rear case 101 described above with reference to FIGS. 1B and 1C, which are integrally formed. The case 504 may be formed of a metal material and may be referred to as a metal case.

The case 504 may have a plurality of conductive members 509 at upper and lower portions, respectively. The plurality of conductive members 509 may be implemented by disposing the slots S1 and S2 in the metal rim of the case. In this case, a non-metal region 507 for insulation may be formed between a base portion 505 and the metal rim 506 of the case 504.

The metal rim 506 defines a side wall at the side of the base portion and the metal rim is divided into a plurality of conductive members 509 by the slots S1 and S2. The conductive members 509 are formed as a portion of a radiator of an antenna.

Here, a first antenna 540 using the conductive member 509 may be formed on at least one of the top and bottom of the mobile terminal and a second antenna 510 may be disposed to be adjacent to the conductive member 509.

In this case, the first antenna 540 is an antenna that operates as MIMO or diversity at a frequency of an LTE band and may be a main antenna of a transmitting or receiving side or a receiving side sub-antenna of a diversity or MIMO system. As another example, the first antenna 540 may be formed to transmit/receive a signal corresponding to a voice service of the mobile terminal, to transmit/receive a WIFI signal, and to transmit/receive a GPS signal.

In contrast, the second antenna 510 may be an array antenna operating in a millimeter wave band of 3.5 GHz or higher and may be a 5G antenna.

Since the second antenna 510 operates in a frequency band higher than that of the first antenna 540, the first antenna 540 will be referred to as a low frequency antenna and the second antenna 510 will be referred to as a high frequency antenna.

As illustrated, the low frequency antenna 540 may include the conductive member 509, which is the metal rim 506 of the case, as a radiator.

For example, the metal rim 506 of the case 504 may have an upper end portion located on the top of the mobile terminal and a lower end portion located on the bottom of the mobile terminal, and the slots may be spaced apart from each other at the upper end portion or the lower end portion. The slots are filled with a non-metal member 532 and the metal rim 506 has the conductive member 509 whose both ends are confined by the slots S1 and S2. The conductive members 509 may be provided in plurality and each conductive member 509 may be formed to transmit and receive signals of different frequency bands in a low frequency band.

As illustrated, the low frequency antenna is directly fed by electrical connecting of the conductive member 509 to the conductive pattern 541. The conductive pattern 541 extends from the main circuit board 530 and is electrically connected to the conductive member 509. However, the present disclosure is not limited thereto, and the low frequency antenna may be indirectly fed by capacitively coupling the conductive member 509 to the conductive pattern 541. The capacitive coupling may be performed by forming the conductive member 509 and the conductive pattern 541 to be parallel with each other during a predetermined section at a predetermined interval. The conductive pattern 541 may be connected to a feeder that supplies current to each member operating as a radiator, and the feeder may be configured by combining a balun, a phase shifter, a divider, an attenuator, and an amplifier. The feeder may be formed on the circuit board and may include a feed connection portion electrically connected to the conductive pattern.

As illustrated, the high frequency antenna 510 may be disposed such that the antenna patterns 511 are arranged between the slots. That is, the high-frequency antenna 510 may be disposed to be adjacent to the conductive member 509 of the low frequency antenna 540.

In this case, a cover glass 551a may be mounted on a front side or a rear side of the case 504. The cover glass 551a may include a planar portion 552 and a bent portion 553 described above and the bent portion 553 may be supported by the conductive member 509.

The high frequency antenna 510 may be an L-shaped antenna described above with reference to FIGS. 2A to 6 or may be a module type antenna described above with reference to FIGS. 10 to 12. Further, in this example, except that the metal rim has the plurality of conductive members 509 and the conductive members 509 are feed-connected, the structure of the case, the camera, the display module, the cover glass, and the antenna may all be applied.

In this case, the high frequency antenna 510 is disposed such that the antenna pattern 511 faces the bent portion 553 of the cover glass 551a. By the arrayed antenna patterns 511 of the antenna, a beamformed wireless signal may be radiated to the side surface or the front surface of the terminal through the bent portion 553.

According to such a structure, the antenna system capable of providing LTE and 5G multiple wireless communication, while having the metal rim on the side surface of the terminal, may be realized.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid-state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal having a front surface, a rear surface, and side surfaces, the mobile terminal comprising:
    a case having a front side, a rear side and a lateral side, the case including a metal rim formed of a metal material and at least one bent portion formed of non-metal material, the lateral side of the case having two short sides and two long sides longer than the two short sides;
    a first cover disposed in the front side of the case, the first cover having a first planar portion and at least one bent portion curved from the first planar portion;
    a display disposed between a front surface of the case and the first cover;
    a second cover disposed in the rear side of the case, the second cover having a second planar portion and at least one bent portion curved from the second planar portion; and
    an antenna disposed between a rear surface of the case and the second cover and configured to radiate a beamforming wireless signal,
    the antenna comprising:
        an insulating member;
        an electronic element disposed on a surface of the insulating member; and
        antenna patterns disposed on another surface of the insulating member,
    wherein a side appearance of the mobile terminal is formed by a bent portion of the first cover, a bent portion of the second cover, and the metal rim of the case,
    wherein a length of the bent portion of the second cover is longer than a length of the bent portion of the first cover,
    wherein the antenna patterns are disposed to face the bent portion of the second cover such that the beamforming wireless signal is radiated through the side surfaces of the mobile terminal,
    wherein the bent portion of the second cover is disposed on a bent portion of the case, and
    wherein the beamforming wireless signal is radiated through the bent portion of the case and the bent portion of the second cover.

2. The mobile terminal of claim 1, further comprising a wireless communication unit,
    wherein the wireless communication unit includes one or more modules which permit a Long Term Evolution (LTE) wireless communication and a 5G wireless communication between the mobile terminal and a wireless communication system.

3. The mobile terminal of claim 1, further comprising an additional antenna, wherein each of the antenna and the additional antenna is disposed to both side surfaces of mobile terminal,
    wherein the both side surfaces are opposite surfaces of each other.

4. The mobile terminal of claim 1, wherein the at least one bent portion of the case is adjacent to the metal rim such that the at least one bent portion of the case is integrally formed with the metal rim.

5. The mobile terminal of claim 1, wherein the metal rim is divided with a plurality of conductive members by a plurality of slots,
    wherein at least two of the plurality of conductive members are operated as a radiator of additional antennas,
    wherein the plurality of conductive members are operated a Multiple-In, Multiple-Out (MIMO) antenna at a frequency band of a Long Term Evolution (LTE) wireless communication, and
    wherein the antenna operates at a frequency band of a 5G wireless communication.

6. The mobile terminal of claim 5, wherein the antenna operates in a frequency band higher than the additional antennas.

7. A mobile terminal having a front surface, a rear surface, and side surfaces, the mobile terminal comprising:
    a case having a front side, a rear side, and a lateral side, the lateral side of the case having two short sides and two long sides longer than the two short side, the lateral side of the case including a metal rim formed of a metal material and at least one bent portion formed of non-metal material, the metal rim divided with a plurality of conductive members by a plurality of slots filled with a non-metal material;
    a first antenna including at least one of the plurality of conductive members;
    a first cover disposed in the front side of the case, the first cover having a first planar portion and at least one bent portion curved from the first planar portion;
    a display disposed between a front surface of the case and the first cover;
    a second cover disposed in the rear side of the case, the second cover having a second planar portion and at least one bent portion curved from the second planar portion; and
    a second antenna disposed between a rear surface of the case and the second cover and configured to radiate a beamforming wireless signal,
    the second antenna comprising:
        an insulating member;
        an electronic element disposed on a surface of the insulating member;
        antenna patterns disposed on another surface of the insulating member,
    wherein a side appearance of the mobile terminal is formed by a first bent portion of the first cover, a second bent portion of the second cover, and the metal rim of the case,
    wherein a length of the second bent portion is longer than a length of the first bent portion,
    wherein the antenna patterns of the second antenna are disposed to face the second bent portion of the second cover such that the beamforming wireless signal is radiated through the side surfaces of the mobile terminal,
    wherein the second bent portion of the second cover is disposed on a bent portion of the case,
    wherein the beamforming wireless signal is radiated through the bent portion of the case and the second bent portion of the second cover, and
    wherein the second antenna operates in a frequency band higher than the first antenna.

8. The mobile terminal of claim 7, further comprising a wireless communication unit,
    wherein the wireless communication unit includes one or more modules which permit a Long Term Evolution (LTE) wireless communication and a 5G wireless communication between the mobile terminal and a wireless communication system.

9. The mobile terminal of claim 7, wherein the bent portion of case is integrally formed with the metal rim.

10. The mobile terminal of claim 7, wherein at least two of the plurality of conductive members are operated as radiators of the first antenna,
  wherein at least two of the plurality of conductive members are operated a Multiple-In, Multiple-Out (MIMO) antenna at a frequency band of a Long Term Evolution (LTE) wireless communication, and
  wherein the second antenna operates at a frequency band of a 5G wireless communication.

11. The mobile terminal of claim 7, further comprising a third antenna, the third antenna comprising:
  an insulating member;
  an electronic element disposed on a surface of the insulating member of the third antenna; and
  antenna patterns disposed on another surface of the insulating member of the third antenna,
  wherein each of the second antenna and the third antenna is disposed to both side surfaces of mobile terminal, and
  wherein the both side surfaces are opposite surfaces of each other.

12. A mobile terminal having a front surface, a rear surface, and side surfaces, the mobile terminal comprising:
  a case having a front side, a rear side, and lateral sides, the lateral sides of the case having two short sides and two long sides longer than the two short side, the lateral sides of the case including a plurality of conductive members formed of a metal material and a plurality of slots filled with a non-metal member, an end of each conductive member is disposed on one of the plurality of slots;
  a plurality of first antennas disposed in at least two of the plurality of conductive members;
  a first cover disposed in the front side of the case, the first cover having a first planar portion and at least one bent portion curved from at least one end of the first planar portion;
  a display disposed between a front surface of the case and the first cover;
  a second cover disposed in the rear side of the case, the second cover having a second planar portion and at least one bent portion curved from at least one end of the second planar portion;
  second and third antennas disposed between a rear surface of the case and the second cover and configured to radiate a first or second beamforming wireless signal, each of the second and third antennas comprising:
  an insulating member;
  an electronic element disposed on a surface of the insulating member; and
  antenna patterns disposed on another surface of the insulating member,
  wherein a side appearance of the mobile terminal is formed by a bent portion of the first cover, a second bent portion of the second cover, and a metal rim of the case,
  wherein the case includes a first bent portion and a second bent portion formed adjacent to the metal rim, wherein the first and second bent portions of the case are opposite surfaces of each other,
  wherein the first and second bent portions of the case are formed with a non-metal material,
  wherein the bent portion of the second cover includes a third bent portion and a fourth bent portion formed at sides of the second planar portion of the second cover,
  wherein the third bent portion of the second cover is disposed on the first bent portion of the case,
  wherein the fourth bent portion of the second cover is disposed on the second bent portion of the case,
  wherein a length of the third bent portion of the second cover is longer than a length of the bent portion of the first cover,
  wherein a length of the fourth bent portion of the second cover is longer than a length of the bent portion of the first cover,
  wherein the second and the third antennas operate in a frequency band higher than the first antennas,
  wherein each of the second antenna and the third antenna is disposed to both side surfaces of the mobile terminal,
  wherein the first beamforming wireless signal of the second antenna is radiated through the first bent portion of the case and the third bent portion of the second cover, and
  wherein the second beamforming wireless signal of the third antenna is radiated through the second bent portion of the case and the fourth bent portion of the second cover.

13. The mobile terminal of claim 12, further comprising a wireless communication unit,
  wherein the wireless communication unit includes one or more modules which permit a Long Term Evolution (LTE) wireless communication and a 5G wireless communication between the mobile terminal and a wireless communication system.

* * * * *